Patented Mar. 19, 1929.

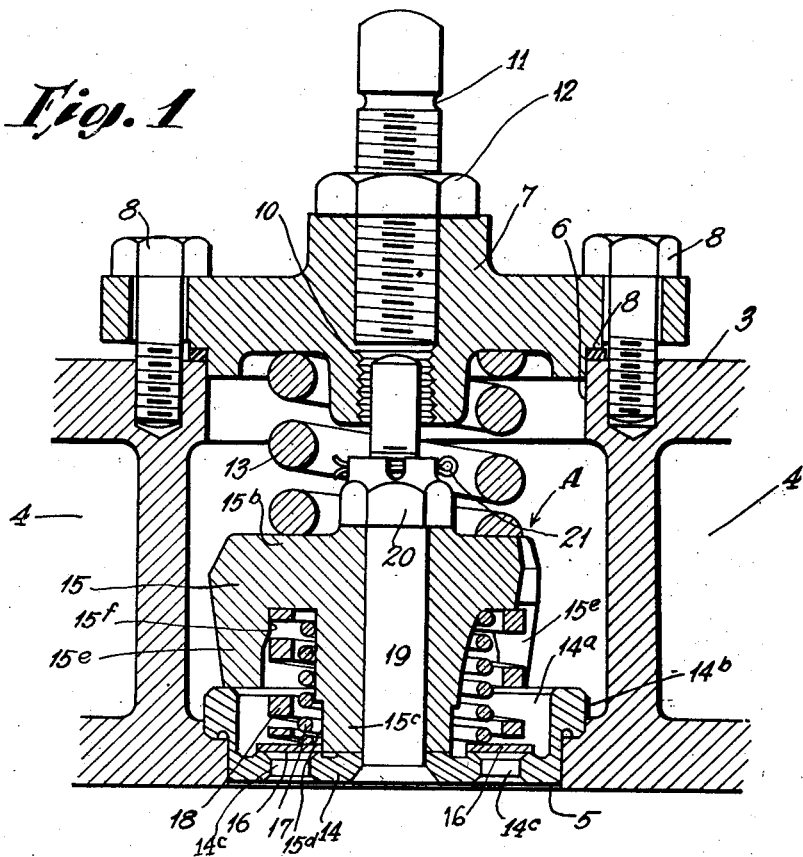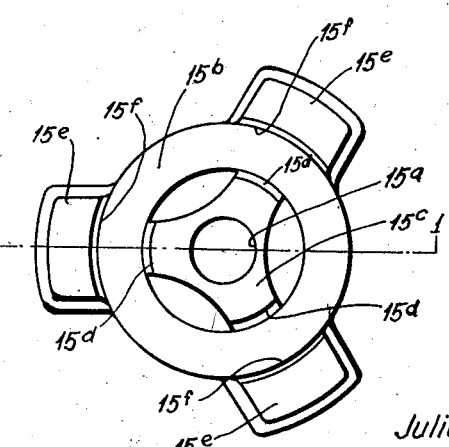

1,705,941

UNITED STATES PATENT OFFICE.

JULIUS C. MOODY, OF FRANKLIN, PENNSYLVANIA, ASSIGNOR TO CHICAGO PNEUMATIC TOOL COMPANY, OF NEW YORK, N. Y., A CORPORATION OF NEW JERSEY.

VALVE.

Application filed January 28, 1927. Serial No. 164,148.

This invention relates to valve devices of the type used in pumps, compressors and similar machines, and has particular reference to valve assemblies adapted to be inserted as a unit and in which valves proper of the wafer or plate type are normally maintained in contact with their seats by resilient means such as springs.

Among the objects of the invention are to increase the life of the valve proper, to provide safety means for maintaining such valve assemblies in place, and in general to improve prior arrangements and construction in the interest of more efficient and satisfactory service.

In order to illustrate the invention one concrete embodiment thereof is shown in the accompanying drawings in which:

Fig. 1 is a vertical sectional view through an engine of the described type showing a valve assembly embodying the invention mounted in a valve chamber of the machine, the keeper member of the valve assembly being shown in section substantially on the line 1—1 of Fig. 2.

Fig. 2 is a plan view from below of the keeper member shown in Fig. 1.

In Fig. 1 a fragmentary portion of the cylinder 3 of a pump, compressor, or other engine is shown. The inner and outer walls of the cylinder provide therebetween chambers 4 for containing cooling liquid such as water. The walls have aligned perforations at 5 and 6 opening into a valve chamber, perforation 6 in the outer wall being the larger to permit the insertion and removal of a valve unit or assembly A. The unit closes the perforation 5 in the inner wall of the cylinder and a closure in the form of a cap 7 is provided for the perforation 6 in the outer wall, the closure being held in place by any suitable means such as cap screws 8. A gasket 9 may be placed under cap 7 to produce a tight seal. Closure 7 has a central screw-threaded opening 10 which receives a set screw 11 arranged to engage valve unit A to clamp the same securely in place, a lock nut 12 being provided to prevent set screw 11 from loosening. By preference a heavy coil spring 13 is inserted between valve unit A and closure 7 as a safety device in order that valve assembly A may be held in tight engagement with the inner wall of the compressor in the event that set screw 11 should not be set up tightly or should become loosened during the operation of the engine.

Valve assembly A comprises a seat member 14, a keeper member 15, a valve proper 16 of the wafer, plate or disc type, a valve spring 17, a buffer spring 18 and a stud 19 with its castle nut 20 and cotter pin 21 for maintaining the aforesaid elements in assembled relation. The head of stud 19 seats in a central opening in seat member 14, extends through an axial bore 15ª in keeper 15 and its nut 20 engages the enlarged outer portion or head 15ᵇ of keeper member 15, which head is in substantial parallelism with seat member 14. Seat member 14 is circular in form to fit perforation 5 in the cylinder wall and has a rearwardly extending annular portion 14ª formed with a projecting flange 14ᵇ to engage the inner cylinder wall. Member 14 has openings 14ᶜ controlled by valve 16. Keeper 15 has a stem portion 15ᶜ partly cut away on three sides and providing guides 15ᵈ for valve 16. Head portion 15ᵇ has depending therefrom a plurality of fingers 15ᵉ, in the present instance 3 in number (Fig. 2), spaced from the stem portion and engaging the rim of the annular extension 14ª of seat member 14. Springs 17 and 18 are disposed in nested relation within the annular recess surrounding stem 15ᶜ. Spring 17 which is the lighter of the two is confined between head 15ᵇ and valve 16 yieldingly to maintain the latter on its seat over openings 14ᶜ. Buffer spring 18 is secured to keeper member 15 at one end in such a manner that its free end is slightly spaced from valve 16 when the latter is on its seat so as to cushion the valve after it has made its initial opening movement. By preference buffer spring 18 is secured to keeper member 15 by causing its upper end to engage or be clamped against the inner faces 15ᶠ of fingers 15ᵉ as with a press fit.

From the above it will be apparent that the present invention eliminates all danger of the valve unit being or becoming loose in the valve chamber, that by provision of buffer spring 18 the valve is cushioned on its opening movement thus avoiding shocks and prolonging the life of the valve and that the assembled unit is of rugged construction having a few simple parts quickly and easily assembled and adapted to efficient service for a long period.

While a preferred form of the invention has been herein shown and described, it is to be understood that the invention is not limited to the specific details thereof, but covers all changes, modifications and adaptations within the scope of the appended claims.

I claim as my invention:

1. A valve unit or assembly comprising a seat member, a plate valve arranged to fit the seat on said member, a keeper member engaging said seat member and forming a guide for said valve, a spring between said keeper member and said valve for yieldingly maintaining the latter on its seat, and a buffer spring carried by said keeper member and normally maintained out of contact with said valve for cushioning the latter on its opening movement.

2. A valve unit or assembly comprising a seat member, a plate valve arranged to fit the seat on said member, a keeper member engaging said seat member and forming a guide for said valve, a spring between said keeper member and said valve for yieldingly maintaining the latter on its seat, and a buffer spring having one end secured to said keeper member with a press fit and its free end normally spaced from said valve for cushioning the latter on its opening movement.

3. A valve unit or assembly comprising a seat member, a plate valve arranged to fit the seat on said member, a keeper member having a stem portion engaging said member and forming a guide for said valve, said keeper member having a radial head with depending fingers substantially concentric with said stem portion, nested springs in the annular recess defined by said portion and said fingers, one of said springs engaging both said head and said valve yieldingly to maintain the latter upon its seat, the other spring being secured to said keeper member out of contact with said valve for cushioning the latter on its opening movement.

4. A valve unit or assembly comprising a circular seat member having a rearwardly directed annular portion with a projecting flange to engage on opening in a cylinder wall, an annular disc or plate valve engaging said seat member within the pocket formed by the annular portion of said member, a keeper member having a stem portion engaging the central portion of said member and forming a guide for said valve, said keeper member having a head spaced from and in parallelism with said seat member and fingers depending from said head engaging the annular portion of said seat member, nested coil springs within the annular recess formed between said seat and keeper members, one spring engaging said head and said valve yielding to hold the latter on its seat, the other spring being supported by said keeper member normally in spaced relation with said valve so as to be engaged by the latter on its opening movement, and means maintaining the foregoing parts in assembled relation.

5. A valve unit or assembly comprising a circular seat member having a rearwardly directed annular portion with a projecting flange to engage on opening in a cylinder wall, an annular disc or plate valve engaging said seat member within the pocket formed by the annular portion of said member, a keeper member having a stem portion engaging the central portion of said seat member and forming a guide for said valve, said keeper member having a head spaced from and in parallelism with said seat member and fingers depending from said head engaging the annular portion of said seat member, nested coil springs within the annular recess formed between said seat and keeper members, one spring engaging said head and said valve yielding to hold the latter on its seat, the other spring having one end engaging the inner faces of said keeper fingers with a press fit and disposing its free end in spaced relation with said valve to cushion the opening movement of the latter, and a stud extending axially through said keeper member for maintaining the aforesaid elements in assembled relation.

Signed by me at Franklin, county of Venango, State of Pennsylvania, this 18th day of January, 1927.

JULIUS C. MOODY.